United States Patent Office 3,429,867
Patented Feb. 25, 1969

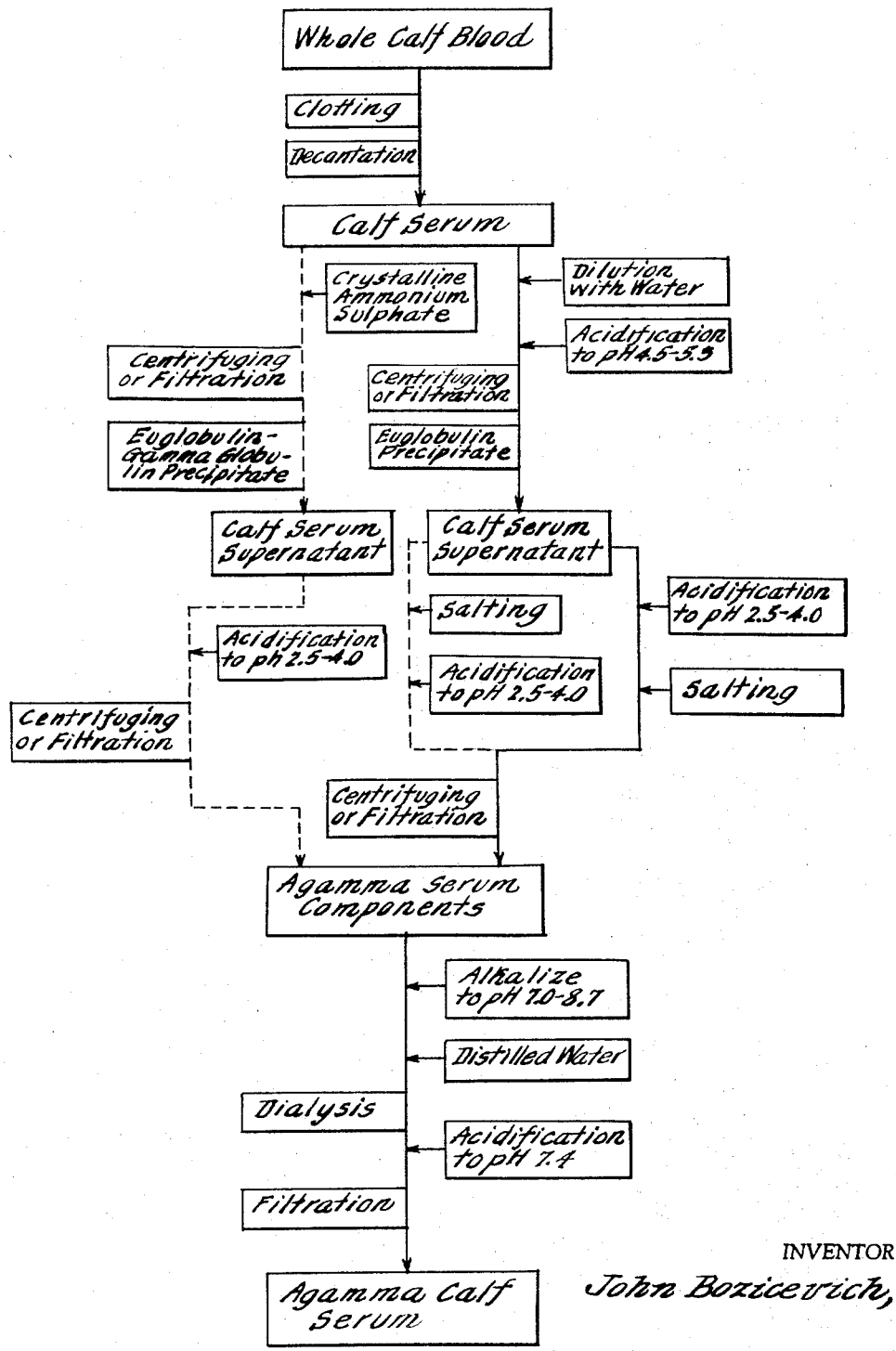

3,429,867
SERUM SUBSTANTIALLY FREE FROM GAMMA GLOBULIN AND METHOD OF PREPARING SAME
John Bozicevich, Bethesda, Md., assignor to Microbiological Associates Inc., Bethesda, Md., a corporation of Florida
Filed Apr. 30, 1965, Ser. No. 452,286
U.S. Cl. 260—112
Int. Cl. C08h *1/00;* C07g *7/00*
14 Claims

ABSTRACT OF THE DISCLOSURE

An agamma calf serum suitable for cell and tissue culture is prepared from calf serum by first precipitating and separating euglobulin, acidifying to pH 4.5–5.3 to precipitate albumin, alpha globulin and beta globulin components leaving gamma globulin in solution, separating the components and then uniformly distributing them in a weakly alkaline aqueous medium having a pH approximately that of normal blood serum.

---

This invention relates to a novel agamma calf serum and to methods for its preparation. More particularly, the invention concerns an agamma calf serum suitable for cell and tissue culture made by isolating serum components other than gamma globulin and uniformly distributing said components in an aqueous medium.

Recently developed techniques of cell, tissue and virus culture have employed calf blood serum as a special medium, supplemented by suitable nutrients of the kind conventionally used in tissue culture. For supporting the growth of human cells, fetal calf serum was originally proposed, but owing to supply difficulties, it was later suggested to employ newborn or immature (1 to 4 day old) calf serum. A method for the preparation of a newborn agamma calf serum is disclosed in U.S. Patent 3,122,476 and involves the precipitation of gamma globulin with ethanol, the other serum components being retained in solution in the serum filtrate. Newborn or immature calf serum is also in limited supply, so that there has existed a need for an effective and economical process for utilizing the serum of older calves, which is much more readily available. It has long been known that gamma globulin contains antibodies which inhibit viral growth in tissue culture. Accordingly, there has also been a need for a method of removing gamma globulin which would enable the utilization of all types of calf serum, and which would be both a departure from and an improvement on existing methods.

In accordance with the present invention, there are provided novel methods for the preparation of a calf serum substantially free from gamma globulin (agamma calf serum), which does not possess the shortcomings of known methods, and which makes possible the effective and economical utilization of all types of calf serums, including those from older calves. The methods of the invention employ the novel principle of isolating from the serum the desired blood fractions or serum components and then uniformly distributing these fractions or components in a weakly alkaline aqueous medium to form a filterable solution thereof, which is thus a reconstituted calf serum, substantially free from gamma globulin and other undesirable components. The resulting reconstituted serum is excellently adapted to the culture of human and other animal cells and tissues, as well as for viral growth.

In the preparation of agamma calf serum in accordance with the invention, whole blood of calves is treated to separate the corpuscles and fibrin by any suitable method, preferably by natural clotting without the use of coagulants. The serum is separated by decantation. The clotted material may be subjected to centrifugation to recover additional serum therefrom.

In the practice of the invention, the calf serum is first treated to separate the euglobulin. In accordance with one embodiment of the invention, the serum is diluted with distilled water and the diluted serum is acidified to the pH value required for complete precipitation of the euglobulin. Alternatively, the serum is treated with solid crystalline alkali metal sulfate, without dilution, to cause precipitation of the euglobulin, as well as precipitation of most of the gamma globulin, and some macroglobulins. The supernatant or filtrate resulting from either of these treatment sequences is then acidified to precipitate the desired serum components or blood fractions, including albumin, alpha and beta globulins, ceruloplasm, and macroglobulins. The precipitate forms the basis of the reconstituted serum of the invention.

These and other steps in the practice of the invention will be more readily understood by reference to the flowsheet of the accompanying drawing, which indicates the alternative procedures.

In accordance with one embodiment of the methods of the invention, calf serum is diluted with distilled water in a proportion which may vary from about 0.5 to about 3.0 volumes of water per one volume of serum. The diluted serum is then acidified to a pH value between about 4.5 and about 5.3, preferably 5.0, with constant stirring, at room temperature, with a mineral acid solution. The purpose of this acidification is to obtain complete precipitation of euglobulin. Gamma globulin remains in solution. The mineral acid may be, for example, hydrochloric, sulfuric, or phosphoric acid. Suitable concentrations are, for example, for HCl, 10–70%, preferably 50%; for $H_2SO_4$, 15–25%, preferably 20%; for $H_3PO_4$, 10–20%, preferably 15%. The precipitated euglobulin is removed by centrifuging, for example in a Sharples centrifuge or by filtration, and discarded. The supernatant or filtrate comprising a solution of serum components minus euglobulin, is ready for the agamma serum component separation step.

In accordance with an alternate embodiment of the invention, the starting calf serum is not diluted with water, but the serum is treated, with rapid stirring, with solid crystalline alkali metal sulfate, at a rate of about 15% to about 25% by weight per liter of serum. The sulfate may be, for example, ammonium, sodium, or potassium sulfate, but ammonium sulfate is preferred. This step results in the precipitation of euglobulin, gamma globulin, and some macroglobulins. The precipitated fractions are removed by centrifuging or filtration. The supernatant or filtrate, comprising a solution of serum components minus euglobulin, gamma globulin, and some macroglobulins, is then ready for the agamma serum component separation step.

The desired serum components may be separated either by acidification followed by salting, or, alternatively, by salting, followed by acidification. Precipitation appears to be facilitated when acidification takes place prior to salting.

The calf serum supernatant, obtained as previously described, may be first acidified with a solution of a mineral acid, to a pH value between about 2.5 and 4.0, preferably to 3.5, with constant stirring, followed by salting to cause precipitation of the desired agamma serum components, the gamma globulin remaining in solution. The salting is preferably performed with 90 grams per liter of NaCl, which must be completely in solution. Alternatively, the NaCl can be added to the supernatant prior to the acidification step, whereupon precipitation occurs upon acidification.

The mixture is centrifuged at about 1500–1800 r.p.m. and the precipitate carefully collected and drained of any excess fluid. Alternatively the precipitate may be separated by filtration. The supernatant or filtrate is discarded. The precipitate, comprising albumin, alpha, beta and other macroglobulins, ceruloplasm, minus substantially all the gamma globulin, advantageously, in from 1 to 3 hours after precipitation, can be employed for the preparation of an agamma calf serum component solution suitable for cell and tissue culture. It constitutes about one-third of the volume of the original serum, and thus forms a "concentrate."

When the calf serum supernatant has been obtained by separation using an alkali metal sulfate precipitant, the sulfate present in the supernatant provides the necessary salting action, so that it is only necessary to acidify in the same manner. The precipitate obtained upon said acidification is separated by centrifuging or by filtration. The recovered precipitate is preserved for further processing. The supernatant or filtrate is discarded.

In the preparation of the agamma calf serum of the invention, the serum component concentrate is converted into a filterable solution by the addition thereto of an alkalizer in an amount sufficient to neutralize and to bring the pH to about 7.0–8.7. Suitable alkalizers for this purpose include alkanolamines, pyridine, and sodium hydroxide, but alkanolamines, such as mono-, di-, and tri-ethanolamine, are preferred. The preferred alkalizer is diethanolamine, employed in a solution containing between about 2% and about 14% by volume, preferably 5%. This solution is added to the serum component concentrate to a pH preferably of 8.5, to form a filterable solution. Thereupon distilled water is added to this solution in an amount sufficient to bring the total volume to approximately one-half of the original starting volume of serum. Thus, if the original volume was 1 liter, and the diethanolamine solution was 400 ml., distilled water would be added to bring the volume of the solution to 500 ml. The volume should not be allowed to exceed this limit substantially, because some water is introduced into the solution during the subsequnet dialysis step. The solution is placed in dialyzing bags and dialyzed against distilled water for about 24 to 48 hours. The dialyzing bags may be made of regenerated cellulose or other suitable material. This removes salts and other dialyzable serum compounds, and excess alkalizer, resulting in a purer serum concentrate in solution. The resulting calf serum solution is now adjusted to a pH of 7.2–7.6, preferably 7.4 by the addition of 0.1 N HCl. This pH value corresponds to the normal pH of blood serum and is adapted to tissue culture. The solution is finally filtered through sterile millipore filters for sterilizing and to avoid the introduction of calcium.

Reconstituted or agamma calf serum obtained in accordance with the methods of the invention, starting with commercial raw calf serum, shows the following approximate ranges of composition:

TABLE 1

| Raw calf serum: | Percent |
| --- | --- |
| Albumin | 50–53 |
| Alpha globulin | 15–17 |
| Beta globulin | 17–19 |
| Gamma globulin | 14–15 |
| Agamma calf serum: | |
| Albumin | 55–60 |
| Alpha globulin | 16–22 |
| Beta globulin | 14–20 |
| Gamma globulin | [1] 0–3 |

[1] 0% by immunoelectrophoresis; 0–3% by paper strip electrophoresis, probably due to "trailing" effect (absorption by the paper).

The following examples illustrate the practice of the invention, but are not to be considered as limiting.

EXAMPLE 1

A raw calf serum containing 50% albumin, 17% alpha globulin, 19% beta globulin, and 15% gamma globulin, was diluted with an equal volume of distilled water. A 50% HCl solution was added dropwise with constant stirring until a pH of 5.0 was reached. The resulting precipitate was separated by centrifuging in a Sharples centrifuge at 1500 r.p.m. and discharged. The supernatant liquid was acidified with 50% HCl with constant stirring to a pH of 3.5, and 90 grams per liter of NaCl was added. The resulting precipitate of serum components minus gamma globulin was centrifuged at 1800 r.p.m. and drained. There was admixed with the precipitate an aqueous solution of 5% by volume of diethanolamine until alkalinity at a pH of 8.5 was reached. Distilled water was then added to a volume equal to one-half of the original starting volume of calf serum. The solution was placed in cellophane dialyzing bags and dialyzed against distilled water for 36 hours. The solution was then removed from the bags and adjusted to pH of 7.4 with 0.1 N HCl. The volume was further adjusted with distilled water and the solution finally filtered through a sterile millipore filter, to form an agamma calf serum suitable for cell and tissue culture. The serum contained 58% albumin, 20% alpha globulin, 20% beta globulin and 3% gamma globulin, based upon paper strip electrophoresis.

EXAMPLE 2

A raw calf serum containing 53% albumin, 15% alpha globulin, 18% beta globulin, and 14% gamma globulin, was treated with an amount of crystalline ammonium sulfate equal to 20% by weight, and the resulting precipitate was removed by centrifuging. The supernatant solution was acidified with constant stirring to a pH of 3.5. The resulting precipitate of serum components, minus euglobulin and gamma globulin, was centrifuged and drained, and then worked up to form an agamma serum as in Example 1. The resulting serum contained 55% albumin, 20% alpha globulin, 20% beta globulin, and 0% gamma globulin.

The foregoing compositions were determined by paper strip electrophoresis and immunoelectrophoresis.

What is claimed is:

1. Method for the preparation of an agamma calf serum suitable for cell and tissue culture comprising the steps of (a) diluting calf serum with from about 0.5 to about 3.0 volumes of water; (b) acidifying with a mineral acid to a pH between about 4.5 and about 5.3 to precipitate euglobulin; (c) separating the precipitate; (d) acidifying the resulting supernatant with a mineral acid to a pH between about 2.5 and about 4.0; (e) adding salt to cause complete precipitation of blood fraction components of said serum substantially free from gamma globulin; (f) separating said components; (g) uniformly distributing said components in a weakly alkaline aqueous medium to form a solution; (h) diluting and adjusting the pH of said solution to approximately that of normal blood serum; and (i) sterile filtering the solution.

2. The method of claim 1 in which the mineral acid is hydrochloric acid having a concentration between about 10% and 70%.

3. The method of claim 1 in which the weakly alkaline aqueous medium has a pH between about 7.0 and 8.7.

4. The method of claim 1 in which the weakly alkaline medium is an aqueous solution of an alkanolamine.

5. Method for the preparation of an agamma calf serum suitable for cell and tissue culture comprising the steps of (a) diluting calf serum with from about 0.5 to about 3.0 volumes of water; (b) acidifying with a mineral acid to a pH between about 4.5 and about 5.3 to precipitate euglobulin; (c) separating the precipitate; (d) adding salt to the supernatant to aid in precipitation of blood fraction components of said serum substantially free from gamma globulin; (e) acidifying with a mineral acid to a pH between about 2.5 and about 4.0; (f) separating said components; (g) uniformly distributing said components in a weakly alkaline aqueous medium to form a solution; (h) diluting and adjusting the pH of said solution to approximately that of normal blood serum; and (i) sterile filtering the solution.

6. The method of claim 5 in which the mineral acid is hydrochloric acid having a concentration between about 10% and 70%.

7. The method of claim 5 in which the weakly alkaline aqueous medium has a pH between about 7.0 and 8.7.

8. The method of claim 5 in which the weakly alkaline medium is an aqueous solution of an alkanolamine.

9. Method for the preparation of an agamma calf serum suitable for cell and tissue culture comprising the steps of (a) treating calf serum with solid crystalline alkali metal sulfate in an amount sufficient to precipitate euglobulin and gamma globulin therefrom; (b) separating the precipitate; (c) acidifying the resulting supernatant with a mineral acid to a pH between about 2.5 and about 4.0; (d) separating the precipitate of blood fraction components of said serum substantially free from gamma globulin; (e) uniformly distributing said components in a weakly alkaline aqueous medium to form a solution; (f) diluting and adjusting the pH of said solution to approximately that of normal blood serum; and (g) sterile filtering the solution.

10. The method of claim 9 in which the mineral acid is hydrochloric acid having a concentration between about 10% and 70%.

11. The method of claim 9 in which the alkali metal sulfate is ammonium sulfate.

12. The method of claim 9 in which the weakly alkaline aqueous medium has a pH between about 7.0 and 8.7.

13. The method of claim 9 in which the weakly alkaline medium is an aqueous solution of an alkanolamine.

14. An agamma calf serum suitable for cell and tissue culture comprising from about 55% to about 60% calf serum derived albumin, from about 16% to about 22% calf serum derived alpha globulin, and from about 14% to about 20% calf serum derived beta globulin, uniformly distributed in an aqueous medium, which is not calf serum derived, said serum having been dialyzed against distilled water to a pH approximately that of normal blood serum and sterile filtered.

References Cited

UNITED STATES PATENTS

| | | | |
|---|---|---|---|
| 1,415,277 | 5/1922 | Terwen et al. | 260—122 |
| 2,705,230 | 3/1955 | Reid | 260—122 |
| 2,765,299 | 10/1956 | Porsche et al. | 260—122 |
| 3,122,476 | 2/1964 | Gaeta | 167—74 |
| 3,128,228 | 4/1964 | Michl | 167—78 |

OTHER REFERENCES

Advances in Protein Chemistry, vol. XIV, 1959, pp. 238–244, Kekwick.

WILLIAM H. SHORT, *Primary Examiner.*

HOWARD SCHAIN, *Assistant Examiner.*

U.S. Cl. X.R.

195—1.1, 1.7, 1.8; 260—122